US009842426B2

(12) United States Patent
Naef et al.

(10) Patent No.: US 9,842,426 B2
(45) Date of Patent: Dec. 12, 2017

(54) VISUALIZATION OF THREE-DIMENSIONAL POWER DISTRIBUTION DATA

(71) Applicant: ABB RESEARCH LTD, Zurich (CH)

(72) Inventors: Martin Naef, Niederrohrdorf (CH); Mats Larsson, Baden-Dättwil (CH)

(73) Assignee: ABB Research LTD, Zurich (CH)

(*) Notice: Subject to any disclaimer, the term of this patent is extended or adjusted under 35 U.S.C. 154(b) by 101 days.

(21) Appl. No.: 14/670,927

(22) Filed: Mar. 27, 2015

(65) Prior Publication Data
US 2015/0199842 A1 Jul. 16, 2015

Related U.S. Application Data

(63) Continuation of application No. PCT/EP2013/070281, filed on Sep. 27, 2013.

(30) Foreign Application Priority Data

Sep. 28, 2012 (EP) .................................... 12186565

(51) Int. Cl.
*G06T 15/08* (2011.01)
*G06T 11/20* (2006.01)

(52) U.S. Cl.
CPC .............. *G06T 15/08* (2013.01); *G06T 11/20* (2013.01); *G06T 2200/04* (2013.01); *G06T 2219/2004* (2013.01)

(58) Field of Classification Search
None
See application file for complete search history.

(56) References Cited

U.S. PATENT DOCUMENTS

2003/0080963 A1* 5/2003 Van Hook .............. A63F 13/00
345/501
2013/0050208 A1* 2/2013 Lin ......................... G06T 17/20
345/420

OTHER PUBLICATIONS

Hamann, Hendrik F. "A measurement-based method for improving data center energy efficiency." Sensor Networks, Ubiquitous and Trustworthy Computing, 2008. SUTC'08. IEEE International Conference on. IEEE, 2008.*

(Continued)

*Primary Examiner* — Vu Nguyen
*Assistant Examiner* — Nurun N Flora
(74) *Attorney, Agent, or Firm* — Taft Stettinius & Hollister LLP

(57) ABSTRACT

Exemplary methods and systems visualize or contour a power distribution system state by displaying to an operator output data values interpolated at output data locations from input data including distributed input data sensor locations in three dimensions and corresponding dynamically updated input data values. The method includes defining triangles in the volume, and determining, for each triangle, closest input data locations according to a closeness criteria. The method also includes projecting each triangle onto a visualization plane, and determining, for an output data location on the visualization plane at least one triangle, the projection of which includes the output data location. The method interpolates, for the output data location, the input data values of the closest input data locations of each of the at least one determined triangle to generate an output data value corresponding to the output data location.

6 Claims, 1 Drawing Sheet

(56) References Cited

OTHER PUBLICATIONS

Notification Concerning Transmittal of International Preliminary Report on Patentability (Froms PCT/IB/326 and PCT/IB/373) and the Written Opinion of the International Searching Authority (Form PCT/ISA/237) dated Apr. 9, 2015 by the International Bureau of WIPO in corresponding International Application No. PCT/EP2013/070281. (6 pages).
International Search Report (PCT/ISA/210) dated Apr. 17, 2014, by the European Patent Office as the International Searching Authority for International Application No. PCT/EP2013/070281.
Written Opinion (PCT/ISA/237) dated Apr. 17, 2014, by the European Patent Office as the International Searching Authority for International Application No. PCT/EP2013/070281.
European Search Report dated Feb. 13, 2015.
Ondej Krejcar, "Complete Low Cost SCADA System of the intelligent House", Jan. 2012, pp. 339-342.
George Grinstein et al., "High-Dimensional Visualizations", Aug. 2001, pp. 1-14.
Imre Lendák et al., "Electric Power System one-line diagram generation with branch and bound algorithm", Sep. 2012, pp. 947-951.

\* cited by examiner

US 9,842,426 B2

VISUALIZATION OF THREE-DIMENSIONAL POWER DISTRIBUTION DATA

RELATED APPLICATION(S)

This application claims priority under 35 U.S.C. §120 to International application PCT/EP2013/070281 filed on Sep. 27, 2013, designating the U.S., and claiming priority to European application 12186565.3 filed in Europe on Sep. 28, 2012. The content of each prior application is hereby incorporated by reference in its entirety.

FIELD

The disclosure relates to the field of supervision of power distribution or energy management systems, and in particular to visualizing and displaying a state or condition of a three-dimensional power distribution network to an operator.

BACKGROUND INFORMATION

A power distribution system should be supervised and monitored because disturbances can result in partial compromise or even total failure of the system. Specifically, an operator should be made aware of any outages within the system in order to conduct appropriate measures. Therefore, the system is supervised at least partially by an operator, and at times in conjunction with a supervisory control and data acquisition (SCADA) component. For human supervision the state of the system is displayed on a screen or a similar viewing device as part of a graphical user interface.

Known power distribution systems can include a large number of sensor or input data locations where data values are collected. Supervisory Control and Data Acquisition (SCADA) units are used in distribution management systems of large buildings, large ships, or low-voltage DC distribution systems for data centers. In these units, some processes, parameters or local statuses can be supervised automatically. In addition, human supervision should be implemented for proper operation of the system. However, the operator can be physically unable to analyze every data location and the data values received from respective locations. For two-dimensional systems, it is known to interpolate the data values of neighboring data locations and to visualize the original data and the interpolated values e.g., by areal color coding or shading, or by iso-lines or contour lines interconnecting locations of equal value on a two-dimensional map of a geographical area.

Algorithms for volumetric three or multi-dimensional interpolation of generic data values retrieved from three-dimensionally distributed data locations are also known. However, such known generic three-dimensional interpolation algorithms are computationally demanding in the context of real-time visualizations or frequent changes of the viewing direction or angle, and disregard any physical structure or subdivision of the volume or space considered.

SUMMARY

An exemplary method of visualizing a state of a power distribution system based on input data including input data values corresponding to input data locations distributed in a three-dimensional volume with structural elements is disclosed, the method comprising: defining triangles in the volume, wherein triangle vertices are located on or close to the structural elements; projecting each triangle onto a visualization plane; determining, for an output data location on the visualization plane within a projected triangle, a point of origin on the triangle; and interpolating, for the point of origin, input data values to generate an output data value corresponding to the output data location.

An exemplary system for visualizing a state of a power distribution system based on input data including input data locations distributed in a three-dimensional volume with structural elements and corresponding input data values is disclosed, the system comprising: a processor configured to: define triangles with triangle vertices located on or close to the structural elements, and adapted to determine, for each triangle, closest input data locations according to a closeness criteria; project each triangle on a visualization plane, determine, for an output data location on the visualization plane at least one triangle, the projection of which includes the output data location; interpolate, for the output data location, the input data values of the closest input data locations of each of the at least one determined triangle; and generate an output data value corresponding to the output data location; and a display for displaying the output data value generated by the processor.

BRIEF DESCRIPTION OF THE DRAWINGS

The subject matter of the disclosure will be explained in more detail in the following text with reference to preferred exemplary embodiments which are illustrated in the attached drawings, in which.

DETAILED DESCRIPTION

Figure 1:
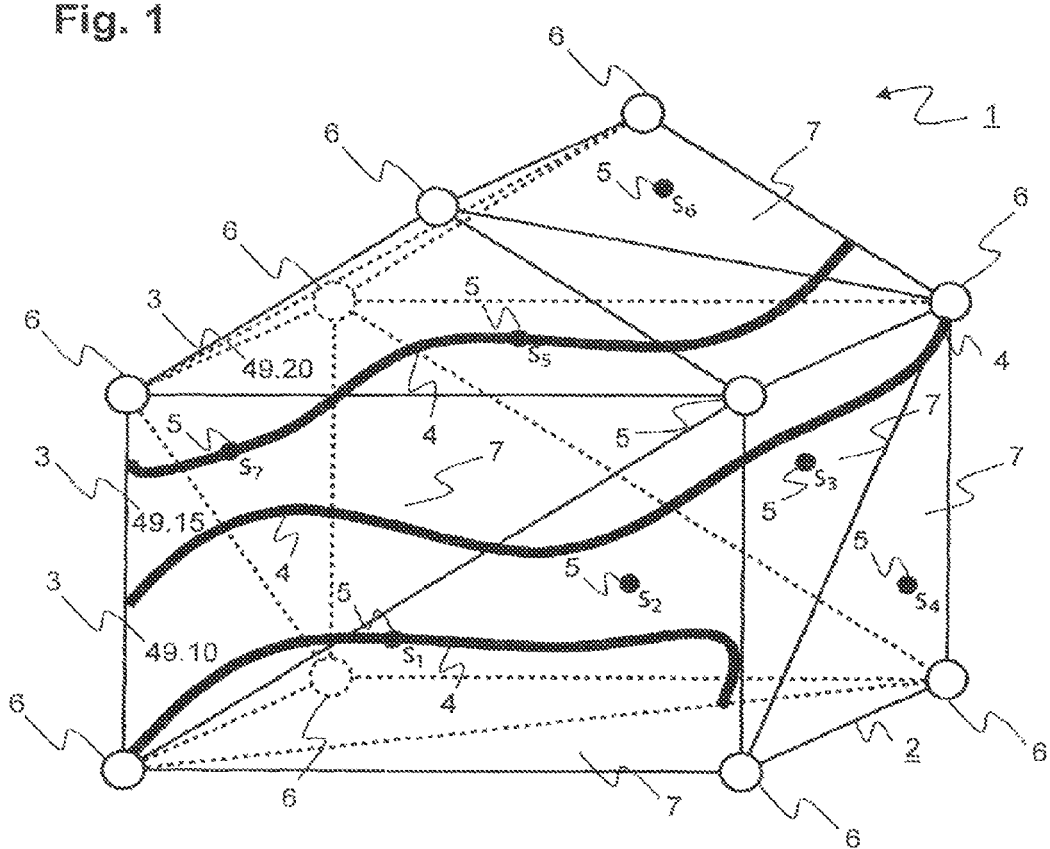
FIG. 1 schematically shows a contour plot to visualize a state of a three-dimensional power distribution or energy management system according to an exemplary embodiment of the present disclosure.

Exemplary embodiments of the present disclosure visualize a state or condition of a three dimensional power distribution system.

Exemplary embodiments of the present disclosure, interpolated output data values are displayed to an operator, wherein the output data values correspond to, or are attributed to, selected output data locations. Visualizing, which is known in the art as contouring, is performed by displaying the output data values in an operator-supportive manner, e.g. by color coding. The output data is based on input data such as voltage, power, temperature or the like including operational input data values retrieved from corresponding input data or sensor locations. For monitoring the system state the input data values can be permanently and dynamically updated. The input data or sensor locations are statically distributed over a volume of interest, e.g., a large building, a vessel, a data center or the like.

In an initial step a volume of interest is divided into triangles wherein each triangle can be defined by or include triangle vertices such as the corners of the triangle. The triangle vertices are located on or close to a surface of a physical, man-made structural element erected within and including the volume, for example a wall, a ceiling or a floor of a multi-story building or a vessel, or a server cabinet enclosure of a data center or a switchgear cabinet of a distribution substation. Such structural elements can be available in a machine readable format from a computer-aided design (CAD) representation of the physical environment. The triangulation is inspired by, and follows, the various structural elements of the volume of interest. In other words, instead of a continuous volumetric model, only a finite number of surfaces are retained as a basis for a triangulated virtual space that is capable of representing the volume of interest.

In a second step each triangle is projected onto a visualization plane that is perceived as being perpendicular to a viewing direction of the operator. The projection is carried out as a transformation from a three-dimensional coordinate system to a two-dimensional display space while retaining depth information indicative of the original, three-dimensional location of the projected triangle, or of the corresponding structural element. Hence, the original three-dimensional visualization task is reduced to a two-dimensional multi plane representation. The operator can define, in a flexible manner, the visualization plane or viewing angle according to a specified preference or depending on a specific area to be controlled or supervised.

In a third step the output data or pixel locations covered by, or pertaining to, the projection of a specified triangle are identified. An interpolation calculation is then performed at or for a point of origin on the triangle that projects onto the output data location. In other words, the latter is extrapolated or hypothetically shifted to define a point of origin on the triangle. Input data points are then evaluated with respect to this point of origin, for example specific input data values are suitably interpolated at the point of origin to generate an output data value corresponding to the output data location. The calculation includes interpolating, by weighting or scaling, the input data values with respect to a distance between input data locations and the point of origin. This procedure is repeated for each triangle of which the projection can include the output data location, and the respective interpolated values are suitably superposed. In other words, for each triangle and for each pixel, the interpolation function is evaluated and the result is blended with a preliminary output data value previously stored in the frame-buffer at the corresponding pixel location.

The proposed triangulation takes into account a physical structure or subdivision of the volume considered in view of a subsequent visualization of the interpolated data superposing the structure, for example a visualization retaining an impression of the underlying physical structure. It provides additional benefits when generating visualization with a transparency effect, the latter being easily achieved by suitably weighing the contributions from the various triangles, and when generating an internal view by simply disregarding or clipping triangles and/or structural surfaces that are the closest to the operator position.

According to an exemplary embodiment of the present disclosure, interpolation of the input data values is carried out for each vertex of a triangle, to obtain interpolated vertex data values. Further interpolation of the interpolated vertex data values of the triangle can be performed in a linear fashion for each point of origin on the triangle. Restricting the extensive interpolation calculation to the triangle vertices in combination with a linear interpolation for all points of origin on the triangle reduces the computation load and speeds up the visualization process.

According to another exemplary embodiment disclosed herein, interpolated vertex data values can be stored for subsequent output data value generation on different visualization planes. This action can be valid as long as input data values are unchanged. As a result, displaying is performed much faster as the update calculation is limited to only a linear or otherwise simplified interpolation of the interpolated vertex data values.

According to yet another exemplary embodiment of the present disclosure, closest input data locations can be determined for each triangle. The closest input data locations are identified by applying a closeness criteria defined by a distance to the triangle. The distance can be defined as the distance to the center, the minimal distance to each corner, or the distance to the closest edge of the triangle. According to another exemplary embodiment, a sorted list of the closest input data locations is generated according to the closeness criteria. Only a limited number N of closest input data locations and corresponding values are then taken into consideration for calculating output data values. By limiting the number of closest input data locations the calculation process can be further accelerated as fewer operations are carried out for any update. An input data structure is generated including, for each triangle, a list of indices of the closest input data locations. The input data structure consists of a two-dimensional array, wherein each row corresponds to one triangle and contains a sorted list of indices to the data locations. The layout of the two-dimensional array is adapted to suit a graphical processor unit used to carry out further operations. The initial triangulation and the generation of the input data structure is only carried out once during initialization, while further steps are repeated on a regular basis, for example for each input data update.

According to another exemplary embodiment described herein, a confidence level is provided for each input data value. The confidence level is a measure of the reliability of the data value retrieved from a data location and can vary dynamically. The operator can set the level for any given data location or an automated process such executed through a special algorithm can set the level according to further information on the data value, e.g., overall reliability of the measurement at the data location in the past. Therefore, poor measurements can be taken into account at a lower weight as compared to more reliable measurements. In addition failing sensors can be assigned a lower confidence level such as to ensure they are disregarded for further processing. Interpolation in this embodiment is carried out with a predefined number N of input data values with a preset minimum confidence level, wherein other data values are not considered.

In a final step, a two-dimensional output pattern is generated based on output data locations and interpolated output data values and the two-dimensional output pattern is further displayed for viewing the power transmission network state by an operator on an optical output device such as a screen (e.g., monitor, display) or the like.

Exemplary embodiments of the present disclosure provide a system for visualization of a state of a power distribution system based on input data including static input data sensor locations disposed in a three-dimensional volume and corresponding dynamically updated input data values. The system includes triangulation means (e.g., processor) adapted to divide the volume into triangles and to determine, for each triangle, closest input data locations according to a closeness criteria. The system can include programmable graphics hardware adapted to project each triangle of the full 3D triangulation model onto a visualization plane defined by a model-view-projection matrix and freely moveable by an operator. The programmable graphics hardware is adapted to determine, for an output data location on the visualization plane at least one triangle, the projection of which includes the output data location. The programmable graphics hardware is finally adapted to interpolate by weighting or scaling, for the output data location, the input data values corresponding to the closest input data locations of each of the at least one determined triangle to generate an output data value corresponding to the output data location.

According to exemplary embodiments of the present disclosure the triangulation means and programmable graphics hardware can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The general processor(s) can be configured to include and perform features of the exemplary embodiments of the present disclosure such as, a method for visualization of a state of a power distribution system based on input data including static input data sensor locations disposed in a three-dimensional volume and corresponding dynamically updated input data values, and thereby function as a special and unique processor. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

A two-dimensional output pattern of the three-dimensional system is generated by an algorithm that is significantly more efficient than traditional approaches and that is executed predominantly by graphical processing unit or hardware. This way the output pattern can be updated quickly and, thus, provide a real-time view of the current system state.

FIG. 1 schematically shows a contour plot to visualize a state of a three-dimensional power distribution or energy management system according to an exemplary embodiment of the present disclosure. As shown in FIG. 1, a three-dimensional volume includes a structure 2 in the shape of a building made of structural elements including wall and roof and hosting a power distribution and/or energy management system 1. A viewing angle or zooming factor can be changed by the operator at any time in order to get a complementary view of the structure 2 and power distribution system 1. While FIG. 1 depicts an overview of the entire structure 2, an enlarged focused view on the structure 2 allows assessing for example, the state of certain areas on individual floors of the structure 2 of a multi-story building.

In the volume, output data values 3 are interpolated at output data locations 4. The output data values 3 are represented by iso-lines or contour lines interconnecting locations of equal value. The number next to the iso-line is the actual value. However, in order to be able to assess the network state, output data values 3 and interpolated values can be visualized (e.g., displayed), e.g. by areal color coding or shading, or as shown in FIG. 1 by iso-lines or contour lines. This way an operator can obtain an overview of the system state and if necessary take appropriate measures in the event of outages or detected problems. An interpolation at output data locations 4 is carried out using input data including input data locations 5 and corresponding input data values. For an adequate display of the system state the input data values can be permanently and dynamically updated. The input data or sensor locations 5 are statically distributed over a volume of interest, as depicted in a large building or a data centre. Furthermore for a colour coded contour plot, individual events or data ranges can be made visible by changing transparency or colour settings in a colour look up table.

By changing the viewing angle the operator can view selected output data values 3 without being obstructed by any other outer output data values 3. In a sliced or internal view structural surfaces that are the closest to the operator position are hidden or rendered transparent, thus generating the impression of insight into (e.g., a view into) the structure. The output data values 3 in this case are shown for walls, floors, and ceilings, of given rooms within in the structure 2.

In order to display the network state as shown in FIG. 1 or an equivalent representation, the output data values 3 can be interpolated by dividing the structure 2 into triangles 7. Triangle vertices 6, such as the corners of the triangles 7, are located on or close to the surface of, for example, a wall, a ceiling or a floor of rooms in the structure 2 and thus are perceived, by an operator-observer, as belonging to such surface. Structural elements can be available in a machine readable format from a CAD representation of the physical environment. The triangulation is inspired by, and follows, the various structural elements of the structure 2. The structure 2 then is represented by its electronic image. The individual stories and rooms or similar subdivisions can be separated in the display by a respective lines or contours. This way a good representation of the actual building is given so an operator can identify certain sections easily.

Figure 2:
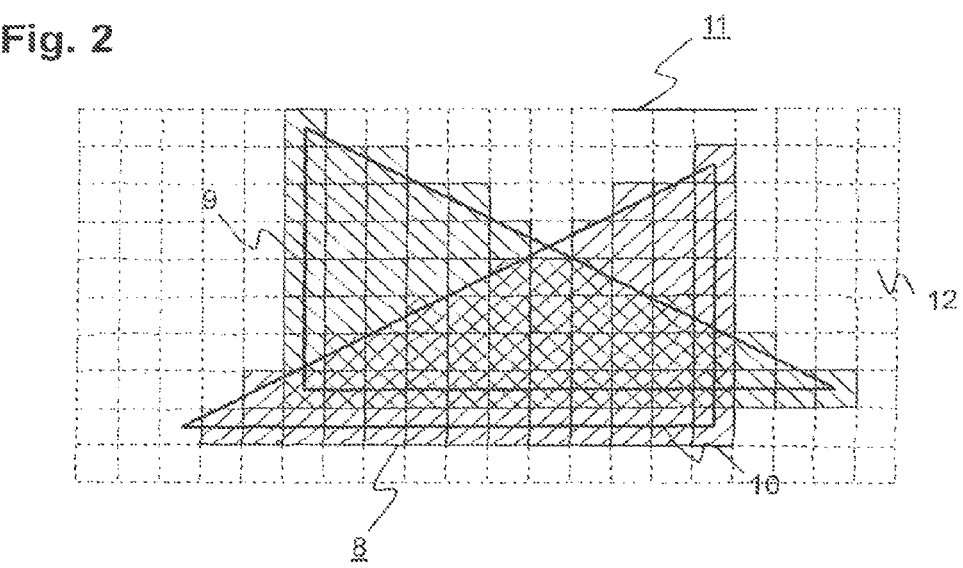
FIG. 2 shows a partly overlapping projection of two triangles to a two-dimensional visualization plane according to an exemplary embodiment of the present disclosure.

FIG. 2 shows a partly overlapping projection of two triangles to a two-dimensional visualization plane according to an exemplary embodiment of the present disclosure. As shown in FIG. 2, an output pattern 8 can be generated on a two-dimensional visualization plane 11 including a multitude of pixel elements 12. The output pattern 8 is based on output data values 3 from output data locations 4 that belong to a first triangle and a second triangle. A projection 9, 10 of the two triangles onto the plane 11 is depicted in FIG. 2, wherein the two triangles are part of a front and rear façade, respectively, of the building depicted in FIG. 1. Hence, for each pixel in the overlap zone, output data values at two output data locations in a line-of-sight on the two triangles are superposed or blended. A three-dimensional or volumetric impression can be generated by applying an overlap approach with different weights for the different triangles involved.

The output pattern 8 can be colour coded for quick assessment of the system state before ultimately being displayed on an optical output device such as a computer screen. In addition, the operator can choose to use a volume slicing technique where e.g., clipping planes are applied to get a clear view on any inside output data values 3 and any interior of a structure 2.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of visualizing a state of a power distribution system, comprising:

retrieving input data comprising voltage, power or temperature, the input data including input data values corresponding to input data locations distributed in a three-dimensional volume with structural elements, the three-dimensional volume comprising a building, vessel, data center or distribution substation, and the structural elements comprising a ceiling or a floor of the building or the vessel, a server cabinet enclosure of the data center, or a switchgear cabinet of the distribution substation;

defining triangles in the volume, wherein triangle vertices are located on or close to the structural elements;

projecting each triangle onto a visualization plane;

determining, for an output data location on the visualization plane within a projected triangle, a point of origin on the triangle; and interpolating, for the point of origin, the input data values to generate an output data value corresponding to the output data location.

2. The method of claim 1, wherein the interpolating step comprises:

interpolating, for each vertex of each triangle, the input data values to obtain interpolated vertex data values; and interpolating, for the point of origin, the interpolated vertex data values of the triangle.

3. The method of claim 2, comprising:

storing the interpolated vertex data values for subsequent evaluation on different visualization planes.

4. The method according to claim 1, comprising:

determining, for each triangle, closest input data locations according to a closeness criteria; and generating an input data structure including, for each triangle, a list of indices of the closest input data locations.

5. The method according to claim 4, comprising:

providing a confidence level for each input data value; and interpolating a predefined number N of input data values with a preset minimum confidence level.

6. The method according to claim 1, comprising:

generating a two-dimensional output pattern based on output data values of all output data locations on the visualization plane; and displaying the two-dimensional output pattern on an optical output device.

* * * * *